(12) United States Patent
Reinhard-Herrscher et al.

(10) Patent No.: US 9,261,281 B2
(45) Date of Patent: Feb. 16, 2016

(54) OVEN ILLUMINATION AND OVEN

(75) Inventors: Fabienne Reinhard-Herrscher, Kirchberg/Jagst (DE); Karl Leidig, Insingen (DE)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 0 days.

(21) Appl. No.: 13/201,248

(22) PCT Filed: Mar. 26, 2010

(86) PCT No.: PCT/EP2010/001930
§ 371 (c)(1),
(2), (4) Date: Aug. 12, 2011

(87) PCT Pub. No.: WO2010/112180
PCT Pub. Date: Oct. 7, 2010

(65) Prior Publication Data
US 2012/0000455 A1   Jan. 5, 2012

(30) Foreign Application Priority Data
Mar. 28, 2009  (EP) .................................... 09004520

(51) Int. Cl.
*F21W 131/307* (2006.01)
*F24C 15/00* (2006.01)
*G02B 3/12* (2006.01)

(52) U.S. Cl.
CPC ............... *F24C 15/008* (2013.01); *G02B 3/12* (2013.01); *F21W 2131/307* (2013.01)

(58) Field of Classification Search
CPC .............................................. F21W 2131/307
USPC ................. 362/92; 126/273 R; 359/665, 667, 359/649–651
See application file for complete search history.

(56) References Cited

U.S. PATENT DOCUMENTS

| | | | | |
|---|---|---|---|---|
| 3,892,223 A * | 7/1975 | McKelvey | | 126/200 |
| 4,048,978 A * | 9/1977 | Plumat et al. | | 126/200 |
| 4,409,512 A * | 10/1983 | Walsh | | 313/113 |
| 4,898,147 A | 2/1990 | Doni et al. | | |
| 5,743,632 A * | 4/1998 | Carl | | 362/294 |
| 6,228,290 B1 * | 5/2001 | Reames et al. | | 264/1.7 |
| 2006/0186429 A1 * | 8/2006 | Chew | | 257/100 |
| 2009/0071463 A1 * | 3/2009 | Ebert et al. | | 126/273 R |
| 2009/0245767 A1 * | 10/2009 | Sakai et al. | | 396/25 |
| 2009/0316385 A1 * | 12/2009 | Weber et al. | | 362/92 |
| 2010/0110717 A1 * | 5/2010 | Chen | | 362/551 |
| 2013/0135862 A1 * | 5/2013 | Leong et al. | | 362/244 |

FOREIGN PATENT DOCUMENTS

| | | |
|---|---|---|
| DE | 3808717 | 9/1989 |
| FR | 2537249 | 6/1984 |
| GB | 05024 | 0/1914 |
| GB | 428498 | 5/1935 |
| WO | 2007031503 | 3/2007 |

OTHER PUBLICATIONS

International Search Report for PCT/EP2010/001930, dated Jun. 25, 2010, 3 pages.

* cited by examiner

Primary Examiner — Julie Bannan
(74) Attorney, Agent, or Firm — Pearne & Gordon LLP

(57) ABSTRACT

The invention in particular relates to an oven illumination (4) for illuminating the interior of a muffle (1) of an oven. Inter alia for improving lifetimes of light sources (6) of the oven illumination (4), a glass lens (7) arranged downstream the at least one light source (6) is provided. The glass lens (7) comprises a cavity (8) at least reducing heat conduction towards the at least one light source (6).

23 Claims, 2 Drawing Sheets

OVEN ILLUMINATION AND OVEN

Figure 1:
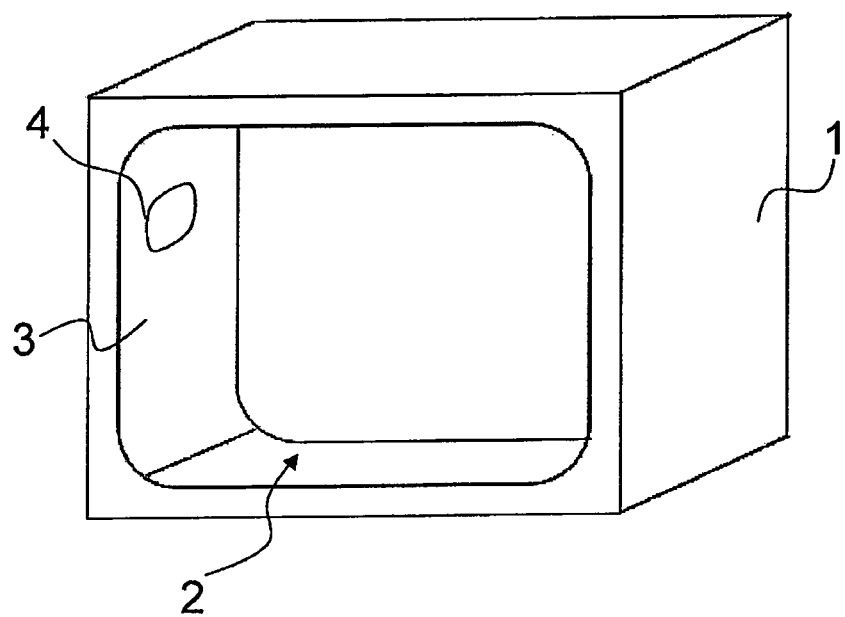

The present invention in particular relates to an oven illumination and to an oven comprising such an oven illumination.

Ovens, particularly baking ovens for household applications, generally are provided with an illumination for illuminating the inner space of the oven's muffle, i. e. the baking chamber. Such illuminations are provided mainly for the purpose of easing visual inspection and control of baking processes by a user.

U.S. Pat. No. 4,853,508 and DE 3803717 exemplarily show oven illuminations comprising incandescent or halogen lamps as light sources. The oven illuminations have glass plates, glass hoods or shades separating and shielding the light sources from the interior of the muffle. Such shielding is necessary for the reason of high temperatures and steamy and dusty atmospheres prevailing within the baking chamber during baking food products.

Due to comparatively high operating temperatures during baking and due to vibrations emanating from heating and air-circulating mechanisms, the lifetime of conventional light sources is restricted. As a consequence, the light sources mentioned beforehand have to be frequently exchanged, which is time and cost intensive.

Further, many conventional oven illuminations only provide comparatively dim lightings quite which are often confined to a relatively small volume of the muffle or baking chamber.

Therefore it is an object of the invention to remove the disadvantages observed with state of the art oven illuminations. In particular, it is an object of the invention to provide a low maintenance oven illumination. Further, a respective oven shall be provided.

This object is solved by claims 1 and 7. Embodiments of the invention result from dependent claims 2 to 6, 8 and 9.

A first aspect of the invention is directed to an oven illumination for illuminating the interior of a muffle of an oven. The oven may be a baking oven for household or industrial application, for example. Baking ovens in general have muffles designed for receiving food products and the like. Recesses or openings provided in muffle walls can be used for accommodating the oven illumination.

According to the invention, the oven illumination comprises at least one light source and a lens arranged downstream the at least one light source. The term "downstream" means that at least a part of the light emitted from the light source passes the lens on its way towards the baking chamber.

A cavity is provided with the lens body at least reducing heat conduction in a direction towards the at least one light source. The term "lens" shall be understood in terms of conventional lenses known from optics.

The inventors realized, that providing such a cavity with a lens body is effective to adequately shield the light source against heat prevailing within the muffle during baking and the like while securing adequate oven illumination. This in particular results in prolonged lifetimes of the light sources, easing maintenance and reducing respective costs.

Preferably, the lens is at least partially made from glass. In particular such a glass lens may be designed such that optimal and uniform illumination can be obtained for a large portion of the muffle, as mentioned above. The surface, shape and other optical parameters can be adapted accordingly. The proper shape and form will, inter alia, be dependent on the size and shape of the muffle, the position of the oven illumination relative to the muffle and other factors. It shall be mentioned, that a muffle can be equipped with more than one oven illumination. Two oven illuminations can be arranged at opposite or complementary sides of the muffle, for example.

The lens comprising the cavity may be of symmetric, asymmetric, regular or irregular shape. In particular, the lens can be shaped like a kind of polyhedron, e. g. like a cube, a frustum or the like. Also, the lens can be shaped like a tube, cylinder, cone and others. In all, the shape of the lens, i.e. at least one of optical and thermal shielding properties, may be selected to provide optimal illumination for at least a predefined portion of the baking chamber.

As already mentioned, the cavity can drastically reduce thermal impacts on the light source. For this reason, light sources can be used that otherwise would suffer damages from high temperatures prevailing during baking and the like. Therefore, temperature sensitive types of light sources, such as light emitting diodes (LEDs), can be used. LEDs are known to show a comparatively bright luminescence. Their use advantageously leads to well illuminated muffles and baking chambers easing visual inspection of food products during baking or roasting.

For the purpose of adjusting the thermal conductance across the lens according to respective needs, the lens can be a hollow lens inherently comprising a cavity. The cavity of the hollow lens can be evacuated or filled with a gaseous or liquid medium favouring the overall thermal resistance across the lens. As a gaseous medium, air or an inert gas such as nitrogen, helium, neon, argon, xenon and the like can be used. It shall be mentioned, that the medium can also be used to influence the illumination properties, as for example spectral distribution, dispersion and the like.

With the illumination according to the invention, the shape of the lens and the cavity can be adjusted to respective needs. In this respect, design and shape of the lens body advantageously are such that light originating from the at least one light source is directed in a predefined direction towards the baking chamber or to a predefined section thereof. In this way, at least a portion of the muffle relevant for visual inspection of food products during baking can be properly illuminated. Further, the shape can be selected such that an illumination angle optimal for visual inspection is achieved.

Beyond that, the lens body can be designed and shaped such that light originating from the at least one light source is dispersed in a predefined angle. Here, uniform diffuse illumination can be obtained.

The lens body may have different sections for at least one of dispersing or directing light to or collecting light in preferred locations. In doing so, the inner of the whole muffle can be properly illuminated at least for visual inspections during baking processes and the like.

In order to enhance the thermal shielding capability of the lens, it is possible to provide a transparent heat protection coating. Such a coating may comprise mica, for example, or any other temperature shielding material transparent for light emitted by the at least one light source.

A second aspect of the invention is directed to an oven for household or industrial application. The oven comprises a muffle and at least one oven illumination according to the first aspect of the invention. Advantages and advantageous effects of the oven directly result from the explanations given in connection with the first aspect.

The at least one oven illumination can be accommodated in a recess or opening of the muffle, preferably positioned in such a way that visual inspection of foodstuff during baking is possible for at least standard utilization and baking procedures.

The oven may comprise a heat sink for removing heat from the oven illumination coupled thereto. Such a heat sink may, in addition, be used to avoid thermal overload of the light source or light sources. This is of particular interest with highly temperature sensitive light sources. Such a heat sink may be based on passive cooling. In particular passive cooling may comprise heat conduction via a part of a housing of the oven. It is also possible to use active cooling elements such as fans or chillers utilizing gaseous or fluid cooling media. Other cooling elements such as Peltier elements can be used instead or additionally.

Figure 2:
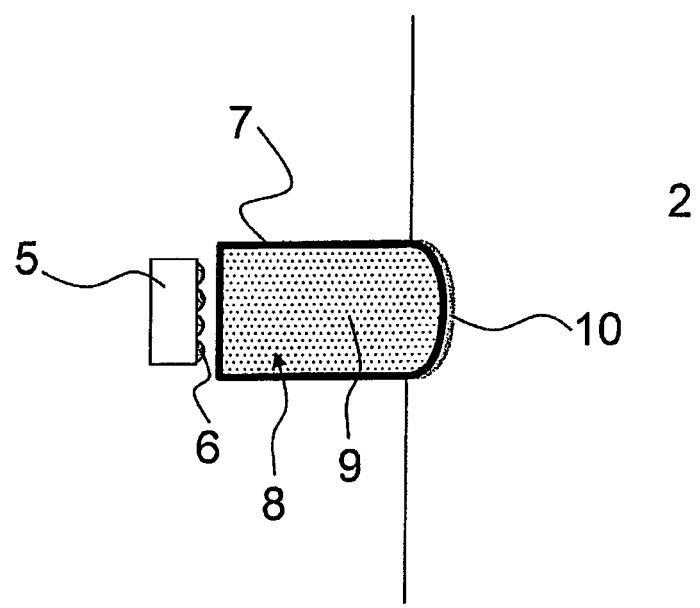

Embodiments of the invention will now be described in connection with the accompanying figures, in which FIG. 1 shows a muffle of a baking oven; and FIG. 2 shows an oven illumination of the baking oven.

FIG. 1 schematically shows a muffle 1 of a baking oven for household appliance. The muffle 1 has side, top and back walls defining a baking chamber 2. The muffle 1 has a front opening 3 for placing and removing foodstuff (not shown) to be baked within and from the baking chamber 2.

Usually, a door (not shown) for tightly closing the front opening 3 during baking is provided. Normally, the door has a transparent glass section. Such a glass section is intended for visual inspection and control of a food item placed in the muffle 1 by a user. Such inspection is preferably done without the need for opening the door.

As muffles 1 of baking ovens in general appear dark when the door is closed and viewed from outside, oven illuminations 4 for illuminating the interior of the muffle 1 are utilized to allow for visual inspection during baking. The oven illumination 4 is placed in a recess provided in a side wall of the muffle 1. The position of the recess is selected such that optimal illumination of the baking chamber 2 can be obtained for at least a majority of standard baking situations.

FIG. 2 shows the oven illumination 4 in more detail. The muffle side wall in which the oven illumination 4 is at least partially integrated is indicated by vertical lines. With the situation in FIG. 2, the baking chamber 2 is located on the right-hand side of the vertical lines.

The oven illumination 4 comprises a light source unit 5. The light source unit 5 in turn comprises several light sources 6. Here, the light sources 6 are light emitting diodes (LEDs) which are also denoted by reference sign 6.

Since light emitting diodes 6 in general are temperature sensitive at least for temperatures prevailing within the muffle 1 during baking, there is a need for thermally shielding the diodes 6. Therefore, a glass lens 7 is arranged downstream the light source unit 5, i. e in between the light source unit 5 and baking chamber 2. The glass lens 7 is of tube-like shape having an oval-like cross section as can be seen from FIG. 1.

Apart from thermal shielding, optical properties of the oven illumination 4 can be adapted by adequately configuring the glass lens 7. Light emitted by the diodes 6 passes the glass lens 7 and can be adequately directed or adequately propagate into the baking chamber if shape, transmission, refraction, dispersion and other optical properties of the glass lens 7 are adapted accordingly. Note that the glass lens 7 may be of non tubular shape, if respective needs and conditions so require.

The right-hand part of the glass lens 7 is shaped and designed in such a way that the light is guided or propagating in a predefined direction and to a predefined location or portion of the baking chamber 2. The location may comprise a center part of the baking chamber, in which food products are positioned at least with standard operational modes. Focusing the light may be beneficial for adequate visual inspection and control of food products during baking. However, the glass lens 7 may be also designed in such a way that the light is dispersed in a predefined angle, which may lead to a more uniform illumination of the baking chamber 2. In all, the oven illumination 4 shown leads to enhanced brightness within the baking chamber 2 and therefore eases visual inspection of food items during baking process.

Coming back to the thermal shielding effect of the glass lens 7, the glass lens 7, i. e. the glass lens body, comprises a cavity 8, which cavity 8 is filled with inert gas 9 with the present embodiment. The cavity 8 reduces heat conduction from the baking chamber 2 towards the diodes 6. In this way a thermal overload of the diodes 6 can be prevented. Thermal conduction is suppressed mainly by the cavity 8 as such, but the inert gas 9 may contribute as well. Note that the glass lens 7 comprising the cavity 8 represents a single optical element that can be placed downstream the diodes 6 for both heat shielding and light collecting purposes. Hence, the assembly and structure of the oven illumination 4 is comparatively easy.

An inert gas 9 or any other gaseous medium may be used for adapting or shifting the spectral range of the light emitted by the diodes 6. In this way, illumination can be adapted to conditions prevailing in baking chambers 2.

Instead of using inert gas and the like, it is also possible to evacuate the cavity 8, likewise reducing thermal conduction along the glass lens 7.

If additional reduction of thermal conduction along the optical path of the glass lens 7 is needed, there is the possibility of applying a transparent heat protection coating 10 to the glass lens 7. The protective coating 10 shown is provided on a side of the glass lens 7 averted from the diodes 6 and facing the baking chamber 2 and may comprise mica.

As an option, the oven illumination 4 can be coupled to a heat sink which may be a housing element for example. In this way heat, detrimental to the diodes 6, can be dissipated. Hence, thermal overload of the diodes 6 can be greatly avoided. The heat sinks may be of active or passive type or both. An LED cooling system may for example comprise cooling devices selected from the group comprising fans, chillers, heat conducting devices and Peltier elements, adapted to provide at least one of passive or active cooling.

The glass lens 7 and cavity 8 provide an effective heat shield for the diodes 6. This heat shield is adequate for preventing heat-induced damages to the diodes 6. The same holds true for temperature sensitive light sources other than diodes 6. A wall thickness of the glass lens 7 can be selected to ensure adequate robustness and hence mechanical protection of the diodes 6.

Diodes 6 are known to emit light which is brighter than that of conventional light sources such as incandescent and halogen lamps. Hence, illumination of the baking chamber 2 can be greatly improved by using L LEDs.

As can be seen, the glass lens 7 in concert with the heat shielding properties of the glass lens 7, in particular the cavity 8, make it possible to use light sources almost irrespective of their heat sensitivity. In particular, comparatively bright emitting light sources such as light emitting diodes can be used. Providing appropriate heat shielding will lead to prolonged lifetimes of the light sources 6, thereby reducing maintenance costs and the like. This is especially the case with diodes 6, as their lifetime in general widely exceeds that of conventional light sources. Note that appropriate adjustment of optical properties of the glass lens 7 and the cavity 8 may result in optimized illumination of the baking chamber 2.

LIST OF REFERENCE NUMERALS 1 muffle
2 baking chamber
3 front opening
4 oven illumination
5 light source unit
6 light source 7 glass lens
8 cavity
9 inert gas
10 coating

The invention claimed is:

1. An oven illumination for illuminating the interior of a muffle of an oven, comprising at least one light source and a lens, wherein the lens comprises a closed hollow cavity, the closed hollow cavity has a continuous boundary formed by the lens, the continuous boundary is completely sealed within the lens, and wherein the lens is arranged downstream of the at least one light source for at least reducing heat conduction towards the at least one light source, wherein the lens comprises a front face for facing the muffle and a rear face for facing the light source, the closed hollow cavity is between the front face and the rear face, and the front face, the rear face, and the closed hollow cavity are arranged downstream of the at least one light source.

2. The oven illumination according to claim 1, wherein the at least one light source is a light emitting diode.

3. The oven illumination according to claim 1, wherein the closed hollow cavity is filled with a gaseous or liquid medium for increasing a thermal resistance across the lens.

4. The oven illumination according to claim 1, wherein the gaseous or liquid medium influences illumination properties of the at least one light source.

5. The oven illumination according to claim 1, wherein the closed hollow cavity is evacuated for increasing a thermal resistance across the lens.

6. The oven illumination according to claim 1, wherein at least a surface of the lens is provided with a transparent heat protection coating.

7. The oven illumination according to claim 1, wherein the oven comprises at least one of active cooling elements and a heat sink for removing heat from the at least one oven illumination.

8. The oven illumination according to claim 7, wherein the oven comprises a housing and parts of the oven housing serve as heat sink.

9. The oven illumination according to claim 1, wherein at least a portion of the lens protrudes into the muffle of the oven.

10. The oven illumination according to claim 1, wherein the closed hollow cavity is filled with inert gas for increasing a thermal resistance across the lens.

11. The oven illumination according to claim 1, wherein the at least one light source is spaced apart from the lens and the closed cavity.

12. The oven illumination according to claim 1, wherein the oven comprises a recess or opening provided in a wall of the muffle for accommodating the oven illumination.

13. The oven illumination according to claim 1, wherein the lens comprises different sections for at least one of dispersing or directing light to or collecting light in preferred locations within the interior of the muffle.

14. The oven illumination according to claim 1, wherein the lens comprising the closed hollow cavity is a single optical element and wherein the single optical element is arranged downstream of the at least one light source.

15. The oven illumination according to claim 1, wherein the closed hollow cavity is filled with at least one of nitrogen, helium, neon, argon, and xenon for increasing a thermal resistance across the lens.

16. The oven illumination according to claim 1, wherein the closed hollow cavity is formed within the lens to conform to a shape of the lens, the shape being tubular.

17. The oven illumination of claim 1, wherein the closed hollow cavity comprises a majority of a volume of the lens.

18. An oven illumination for illuminating the interior of a muffle of an oven, comprising at least one light source and a lens, wherein the lens comprises a sealed hollow cavity, wherein the lens and the sealed hollow cavity are arranged downstream of the at least one light source, and wherein the lens is at least partially integrated in a recess or opening in a wall of the oven muffle such that at least a portion of the sealed hollow cavity is arranged between the at least one light source and the oven muffle for at least reducing heat conduction towards the at least one light source, wherein the lens comprises a front face for facing the muffle and a rear face for facing the light source, the sealed hollow cavity is between the front face and the rear face, and the front face, the rear face, and the sealed hollow cavity are arranged downstream of the at least one light source.

19. The oven illumination according to claim 18, wherein the lens has a tubular shape.

20. The oven illumination according to claim 19, wherein the sealed hollow cavity is formed within the lens to conform to the tubular shape of the lens.

21. The oven illumination according to claim 18, wherein the sealed hollow cavity has a continuous boundary formed by the lens, and wherein the continuous boundary is completely closed with the lens.

22. The oven illumination according to claim 21, wherein the lens has a tubular shape.

23. The oven illumination according to claim 22, wherein the continuous boundary formed by the lens conforms to the tubular shape of the lens.

* * * * *